(12) United States Patent
Yahagi et al.

(10) Patent No.: US 9,175,767 B2
(45) Date of Patent: Nov. 3, 2015

(54) SHIFT CONTROL DEVICE FOR CONTINUOUSLY VARIABLE TRANSMISSION

(71) Applicant: Fuji Jukogyo Kabushiki Kaisha, Tokyo (JP)

(72) Inventors: Hiromichi Yahagi, Tokyo (JP); Keisuke Ajimoto, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/592,779

(22) Filed: Jan. 8, 2015

(65) Prior Publication Data
US 2015/0198247 A1 Jul. 16, 2015

(30) Foreign Application Priority Data

Jan. 15, 2014 (JP) ................................. 2014-004798

(51) Int. Cl.
*G06F 7/00* (2006.01)
*F16H 61/662* (2006.01)
*F16H 61/02* (2006.01)
*B60K 31/00* (2006.01)

(52) U.S. Cl.
CPC .......... *F16H 61/662* (2013.01); *B60K 31/0058* (2013.01); *F16H 61/0213* (2013.01); *F16H 2061/0234* (2013.01); *F16H 2061/0244* (2013.01)

(58) Field of Classification Search
CPC .............. F16H 61/662; F16H 61/0213; F16H 2061/0244; F16H 2061/0234; B60K 31/0058
See application file for complete search history.

(56) References Cited

U.S. PATENT DOCUMENTS

| 2010/0076652 A1* | 3/2010 | Hyodo et al. ................... 701/50 |
| 2011/0312469 A1* | 12/2011 | Honda ............................. 477/39 |
| 2012/0150396 A1* | 6/2012 | Ajimoto et al. ................. 701/52 |
| 2015/0045183 A1* | 2/2015 | Aichi et al. ..................... 477/37 |

FOREIGN PATENT DOCUMENTS

| JP | 2012-192843 A | 10/2012 |
| JP | 2012-206699 A | 10/2012 |

* cited by examiner

*Primary Examiner* — David J Hlavka
(74) *Attorney, Agent, or Firm* — McGinn IP Law Group, PLLC

(57) ABSTRACT

When a stepped shift control mode has been selected by a selection operation accepting unit and an acquired value of an indicator acquired by an indicator value acquisition module is greater than a required value of the indicator calculated from a required driving force calculated by a drive assist device, a shift control module executes shift control in the stepped shift control mode. If the acquired value is smaller than the required value, the shift control module executes shift control in the stepless shift control mode.

16 Claims, 3 Drawing Sheets

SHIFT CONTROL DEVICE FOR CONTINUOUSLY VARIABLE TRANSMISSION

CROSS-REFERENCE TO RELATED APPLICATIONS

The present application claims priority from Japanese Patent Application No. 2014-004798 filed on Jan. 15, 2014, the entire contents of which are hereby incorporated by reference.

BACKGROUND

1. Technical Field

The present invention relates to a shift control device for a continuously variable transmission, and more particularly relates to a shift control device for a continuously variable transmission which is installed in a vehicle equipped with a drive assist device, and which is capable of switching over control modes in accordance with driver operations.

2. Related Art

These days, vehicles are in practical use which enable selection (switching) among multiple operating modes, for example engine output characteristic (output mode), continuously variable transmission gearshift characteristic and/or gearshift modes, in accordance with a user preference (see Japanese Unexamined Patent Application Publication (JP-A) No. 2012-192843, for example).

An example of such vehicles is a vehicle which allows the driver to select an engine output characteristic among three output modes, according to preference. The three engine output modes are a normal mode suitable for normal driving, a save mode (or economy mode) where output torque is suppressed to conserve gas mileage, and a power mode which gives priority to power, having an output characteristic with good responsivity from low speed to high speed ranges. The vehicle also enables the shift control mode of the continuously variable transmission to be selectively switched between a normal stepless shift control mode where gear ratio is steplessly changed according to the running state of the vehicle, such as accelerator position and vehicle speed, and a stepped shift control mode where the gear ratio is changed like with a stepped automatic transmission (AT), in accordance with the selected output mode. For example, normal stepless shift control is executed when the save mode or normal mode is selected, and stepped shift control which performs stepped acceleration is executed when the power mode is selected.

Further, drive assist devices are in practical use which assist driving operations of the driver, by recognizing the driving environment in front of the vehicle and emitting a warning regarding an obstacle ahead, detecting a preceding vehicle from the recognized driving environment ahead and performing preceding vehicle following control or warning control (e.g., see JP-A Nos. 2012-192843 and 2012-206699. In particular, JP-A No. 2012-206699 discloses a technique for adaptive cruise control (ACC) having a preceding vehicle following function. Specifically, the vehicle is driven at a constant speed if no vehicle is detected ahead, and if a preceding vehicle is detected, the vehicle is controlled to follow the preceding vehicle.

When the vehicle is controlled to follow the preceding vehicle such that a distance to the preceding vehicle is kept constant, the drive assist device such as described above may be configured to calculate required driving force which is necessary for the vehicle to follow the preceding vehicle, output required engine torque to the engine based on the computation result, and output to the continuously variable transmission a required gear ratio or a required speed (e.g., required turbine speed) which is defined with the required gear ratio.

When the above-described power mode, i.e., stepped shift control mode, is selected in a vehicle equipped with a continuously variable transmission capable of switching between driving modes (shift control modes) such as described above, the gear ratio which the stepped shift control can assume is restricted. Thus, the target gear ratio calculated by continuously variable transmission (or the target speed obtained from the target gear ratio) may not be the same as the required gear ratio (or the required speed obtained from the required gear ratio) calculated by the drive assist device. Accordingly, when the vehicle is following the preceding vehicle according to instructions of the drive assist device (required engine torque and required gear ratio), and then the preceding vehicle leaves the road so the driver of the vehicle equipped the drive assist device steps on the accelerator pedal, for example, stepped acceleration may not be performed against the driver's intention of stepped acceleration, thereby giving the driver a feeling of wrongness.

SUMMARY OF THE INVENTION

The present invention has been made in light of the above-described problem, and accordingly it is an object thereof to provide a shift control device of a continuously variable transmission can select a stepless shift control mode and a stepped shift control mode, and can perform consistent shift control without contradicting the intention of the driver even when a target gear ratio (or target speed) calculated by a continuously variable transmission side not the same as the required gear ratio (or required speed) calculated by the drive assist device, An aspect of the present invention provides a control device for a continuously variable transmission that has a stepless control mode where a gear ratio is automatically steplessly shifted, and a stepped shift control mode where a gear ratio is automatically shifted in a stepped manner, in the same way as with a stepped automatic transmission. The shift control device includes: a selection operation accepting module that accepts a driver's selecting operation between the stepless shift control mode and the stepped shift control mode; a drive assist device that recognizes an environment outside of a vehicle, and calculates required driving force for the vehicle; an indicator value acquisition module that acquires an acquired value of an indicator having correlation with an acceleration request by the driver; and a shift control module that, when the stepped control mode has been selected by the selection operation accepting unit and the acquired value is greater than a required value of the indicator calculated from a required driving force calculated by the drive assist device, executes shift control in the stepped shift control mode, and if the acquired value is smaller than the required value, executes shift control in the stepless shift control mode.

The drive assist device may set a required gear ratio or a required speed based on the required driving force. When performing control by the stepped shift control mode, the shift control module may perform shift control based on a target gear ratio or target speed that is set according to a running state of the vehicle. When performing shift control by the stepless shift control mode, the shift control module may compare the required gear ratio with the target gear ratio or the required speed with the target speed, and perform shift control based on the greater value.

The indicator value acquisition module may acquire an accelerator depressing amount by the driver as the acquired value. When the accelerator depressing amount acquired by the indicator value acquisition module is greater than a required accelerator depressing amount calculated from the required driving force obtained by the drive assist device, the shift control module may execute shift control by the stepped shift control mode. When the accelerator depressing amount is smaller than the required accelerator depressing amount, the shift control module may execute shift control by the stepless shift control mode.

The indicator value acquisition module may acquire either one of a target gear ratio and target speed, set according to the running state of the vehicle, as the acquired value. When an acquired target gear ratio acquired by the indicator value acquisition module is greater than the required gear ratio or an acquired target speed acquired by the indicator value acquisition module is higher than the required speed, the shift control module may execute shift control by the stepped shift control mode. When the acquired target gear ratio is smaller than the required gear ratio or the acquired target speed is lower than the required speed, the shift control module may execute shift control by the stepless shift control mode.

The indicator value acquisition module may acquire an estimated driving force set according to an accelerator depressing amount as the acquired value. When an acquired estimated driving force acquired by the indicator value acquisition module is greater than the required driving force, the shift control module may execute shift control by the stepped shift control mode. When the acquired estimated driving force is smaller than the required driving force, the shift control module may execute shift control by the stepless shift control mode.

DETAILED DESCRIPTION

Figure 1:
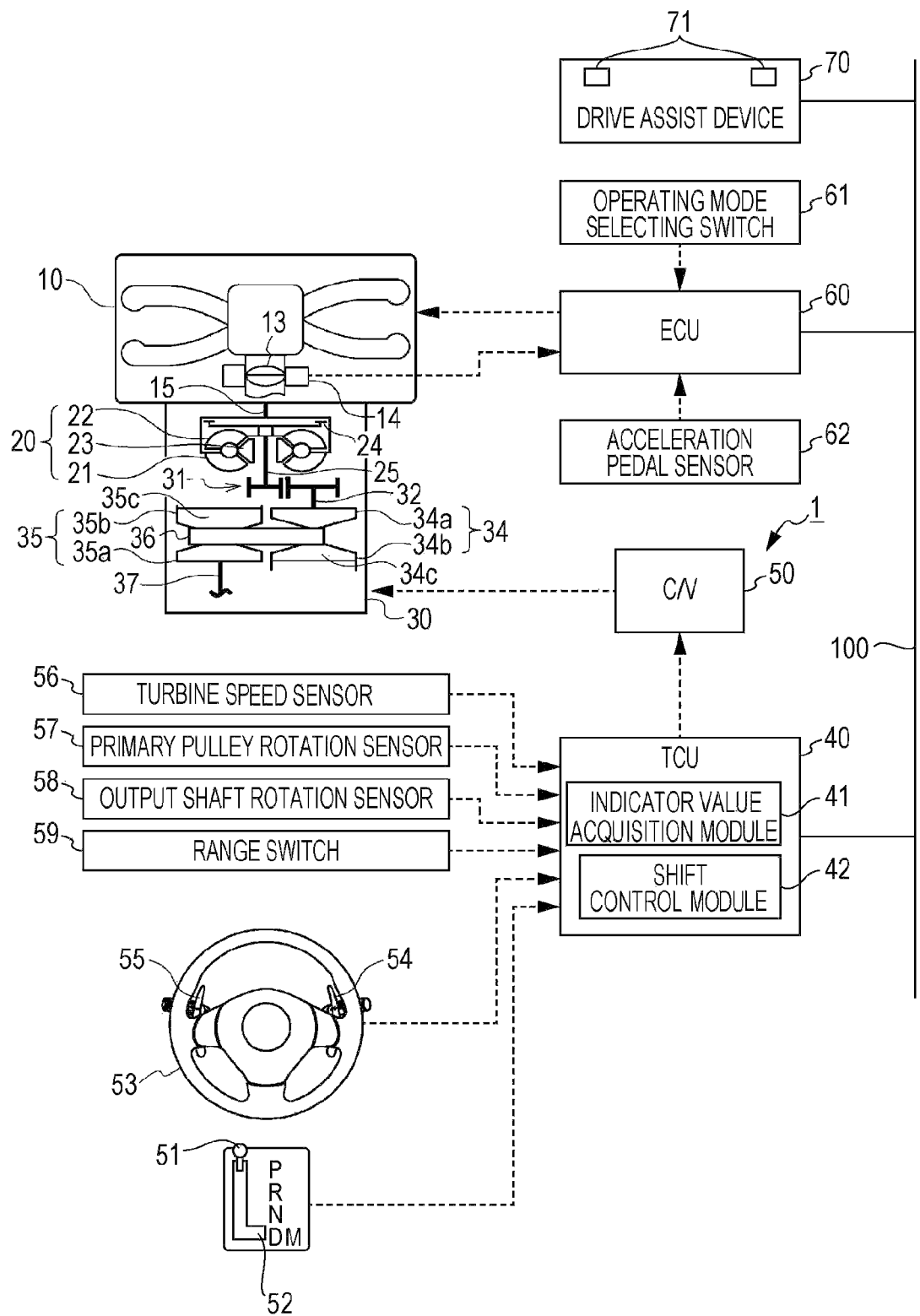
FIG. 1 is a block diagram illustrating the configuration of a shift control device for a continuously variable transmission according to an implementation.

An implementation of the present invention will be described in detail with reference to the drawings. Components which are the same or equivalent in multiple drawings are denoted with the same reference numerals. The same components in the drawings are denoted with the same reference numerals, and redundant description thereof will be omitted.

First, the configuration of a shift control device 1 for a continuously variable transmission according to the implementation will be described with reference to FIG. 1. FIG. 1 is a block diagram illustrating the configuration of the shift control device 1 for a continuously variable transmission, and a continuously variable transmission 30 or the like to which the shift control device 1 of the continuously variable transmission is applied.

An engine 10 may be of any type, and the present implementation employs a horizontally-opposed four-cylinder gasoline engine as an example. In this engine 10, air which has been drawn in from an air cleaner (omitted from illustration) is throttled by an electronic control throttle valve (hereinafter, simply "throttle valve") 13 provided to an intake pipe, passes through an intake manifold, and is suctioned into the cylinders formed in the engine 10. The amount of air drawn in from the air cleaner is detected by an air flow meter. The throttle valve 13 is provided with a throttle position sensor 14 which detects the position of the throttle valve 13. Each cylinder is provided with an injector which injects fuel into the cylinder. Each cylinder also has a spark plug that ignites air-fuel mixture, and an ignitor coil that applies high voltage to the spark plug, attached thereto. Air-fuel mixture of the drawn air and the fuel injected by the injector is ignited by the spark plug in each cylinder of the engine 10 and thus combusted. Exhaust gas after combustion is discharged through an exhaust pipe.

The engine 10 is capable of switching between three output characteristic modes (three stages). More specifically, the engine 10 is set such that the output torque thereof changes substantially linearly as to the amount of depressing of the accelerator pedal (accelerator position). Switching between a normal mode which is suitable for normal driving, a save mode where output torque is suppressed to realize both easy driving and good gas mileage (economy mode), and a power mode which gives priority to power to exhibit good response from a low speed range through a high speed range can be performed by an operating mode selecting switch 61 disposed on a center console or the like, for example.

In addition to the above-described air flow meter and the throttle position sensor 14, a cam angle sensor is attached nearby the camshaft of the engine 10, to distinguish cylinders of the engine 10. Also, a crank angle sensor is attached nearby the crankshaft of the engine 10 to detect the rotational position of the crankshaft. These sensors are connected to a later-described engine control unit (hereinafter "ECU") 60. The above-described operating mode selecting switch 61 is connected to the ECU 60. Various sensors are also connected to the ECU 60, such as an acceleration pedal sensor 62 that detects the position of the acceleration pedal, i.e., the amount by which the acceleration pedal has been depressed, a water temperature sensor that detects the temperature of coolant water for the engine 10.

An output shaft 15 of the engine 10 is connected to the continuously variable transmission 30 which converts and outputs driving force from the engine 10, via a torque converter 20 which has a clutch function and a torque amplifying function.

The torque converter 20 mainly includes a pump impeller 21, a turbine liner 22, and a stator 23. The pump impeller 21 which is connected to the output shaft 15 generates oil flow, and the turbine liner 22 disposed facing the pump impeller 21 receives the power of the engine 10 through the oil, so as to drive the output shaft. The stator 23 which is interposed between the two rectifies the discharge flow (return) from the turbine liner 22 and returns this to the pump impeller 21, thereby realizing the torque amplifying effect.

The torque converter 20 also includes a lock-up clutch 24 which places the input and the output in a directly coupled state. The torque converter 20 amplifies the torque of the driving force of the engine 10 when the lock-up clutch 24 is not engaged (when in a non-lock-up state) and transmits the amplified torque to the continuously variable transmission 30, while the torque converter 20 directly transmits the driving force of the engine 10 to the continuously variable transmission 30 when the lock-up clutch 24 is engaged (when in a lock-up state). The speed of the turbine liner 22 (turbine speed) constituting the torque converter 20 is detected by a turbine speed sensor 56. The detected turbine speed is output to a later-described transmission control unit (hereinafter referred to as "TCU") 40.

The continuously variable transmission 30 includes a primary shaft 32 connected to an output shaft 25 of the torque converter 20 via a reduction gear 31, and a secondary shaft 37 disposed in parallel with the primary shaft 32.

The primary shaft 32 is provided with a primary pulley 34. The primary pulley 34 includes a fixed sheave 34a which is affixed to the primary shaft 32, and a movable sheave 34b which faces the fixed sheave 34a and is slidably movable in the axial direction of the primary shaft, so that the spacing between the conical faces of the sheaves 34a and 34b, i.e., the pulley groove width, can be changed. On the other hand, the secondary shaft 37 includes a secondary pulley 35. The secondary pulley 35 includes a fixed sheave 35a which is affixed to the secondary shaft 37, and a movable sheave 35b which faces the fixed sheave 35a and is slidably movable in the axial direction of the secondary shaft 37, so that the pulley groove width can be changed.

A chain 36 runs between the primary pulley 34 and the secondary pulley 35 to transmit driving force. The gear ratio is steplessly changed by changing the groove widths of the primary pulley 34 and the secondary pulley 35 and thus changing the ratio of the belt loop radius of the chain 36 riding on the pulleys 34 and 35 (pulley ratio). The gear ratio i can be expressed by $$i = Rs/Rp$$

where Rp represents the pitch radius of the chain 36 as to the primary pulley 34, and Rs as to the secondary pulley 35.

A hydraulic chamber 34c is formed in the primary pulley 34 (movable sheave 34b), and a hydraulic chamber 35c is formed in the secondary pulley 35 (movable sheave 35b). The groove widths of the primary pulley 34 and secondary pulley 35 are set and changed by adjusting a primary oil pressure introduced to the hydraulic chamber 34c of the primary pulley 34 and a secondary oil pressure introduced to the hydraulic chamber 35c of the secondary pulley 35.

The oil pressures for changing the speed of the continuously variable transmission 30, i.e., the aforementioned primary oil pressure and the secondary oil pressure are controlled by a valve body (control valve) 50. The valve body 50 adjusts the oil pressure of oil discharged from an oil pump by opening and closing an oil passage formed within the valve body 50, using a spool valve and a solenoid valve (electromagnetic valve) that moves the spool valve. Then, the valve body 50 provides the hydraulic chamber 34c of the primary pulley 34 and the hydraulic chamber 35c of the secondary pulley 35 with the oil pressure thus adjusted. The valve body 50 also supplies an oil pressure to a forward/reverse switching mechanism which switches the forward/reverse directions of the vehicle, and so forth.

A shift lever (select lever) 51 which accepts driver operations to switch to one or the other of an automatic shift mode ("D" range) and a manual shift mode ("M" range) is provided on the floor (center console) or the like of the vehicle. A range switch 59 is connected with the shift lever 51 so as to operate in conjunction with it, and detects the selected position of the shift lever 51. The TCU 40 is connected to the range switch 59, and reads the selected position of the shift lever 51 detected by the range switch 59. The shift lever 51 is used to selectively switch between the "D" range and "M" range, as well as a parking "P" range, reverse "R" range, and neutral "N" range.

The shift lever 51 includes an M range switch 52 which is turned on when the shift lever 51 is at the "M" range position, i.e., when the manual shift mode is selected, and is turned off when the shift lever 51 is at the "D" range, i.e., when the automatic shift mode is selected. The M range switch 52 is also connected to the TCU 40.

On the other hand, behind a steering wheel 53 are provided a plus (+) paddle switch 54 and a minus (−) paddle switch 55 which accept driver gear shift operations (gear shift requests) when the manual shift mode has been selected. Hereinafter, the plus paddle switch 54 and the minus paddle switch 55 may be collectively referred to as "paddle switches 54 and 55". The plus paddle switch 54 is used for a manual shift-up, and the minus paddle switch 55 is used for a manual shift-down.

The plus paddle switch 54 and the minus paddle switch 55 are connected to the TCU 40, and the TCU 40 reads switch signals output from the paddle switches 54 and 55. The TCU 40 is also provided with a primary pulley rotation sensor 57 which detects the rotational speed of the primary pulley 34, an output shaft rotation sensor (vehicle sensor) 58 which detects the rotational speed of the secondary shaft 37, and so forth.

As described above, the continuously variable transmission 30 has the two shift modes which can be selectively switched over by operating the shift lever 51; the automatic gear mode, and the manual shift mode. The automatic shift mode is selected by operating the shift lever 51 to the D range, and in this mode the gear ratio is automatically changed in accordance with the driving state of the vehicle. The manual shift mode is selected by operating the shift lever 51 to the M range, and in this mode the gear ratio is switched by the driver's gear shift operations (operations of the paddle switches 54 and 55).

In further detail, the shift control mode of the continuously variable transmission 30 is decided by the combination of the output mode of the engine 10 described above (operated position of the operating mode selecting switch 61) and the operated position of the shift lever 51 (gearshift mode). Specifically, when the save mode or the normal mode has been selected and the shift lever 51 is shifted to the D range (automatic shift mode) when, normal stepless shift control is performed, and when the power mode has been selected and the shift lever 51 is shifted to the D range, stepped shift control is performed for stepped acceleration. On the other hand, when either one of the save mode and normal mode has been selected and the shift lever 51 is shifted to the M range (manual shift mode), six-speed manual shift control is performed, and when the power mode has been selected and the shift lever 51 is shifted to the M range, eight-speed manual shift control is performed. Thus, the operating mode selecting switch 61 and the shift lever 51 serve as the selection operation accepting unit described of the present invention.

The shift control of the continuously variable transmission 30 is performed by the TCU 40. The TCU 40 controls the driving of the solenoid valve (electromagnetic valve) of the aforementioned valve body 50, thereby adjusting the oil pressures supplied to the hydraulic chamber 34c of the primary pulley 34 and the hydraulic chamber 35c of the secondary pulley 35 so as to change the gear ratio of the continuously variable transmission 30.

The TCU 40 is communicably connected to the ECU 60 which centrally controls the engine 10, a drive assist device 70, and so forth, via a controller area network (CAN) 100, for example.

Each of the TCU 40, the ECU 60, and the drive assist device 70 includes a microprocessor which performs computations, read only memory (ROM) which stores programs and so forth so as with which the microprocessor executes the various processes, a random-access memory (RAM) which stores various types of data such as computation results and so forth, a backup RAM which holds the stored contents by way of a 12 V battery, an input/output interface, and so forth.

The ECU 60 distinguishes the cylinders based on the output of the cam angle sensor, and calculates the engine speed based on a change in the rotational position of the crankshaft detected with the output of the crank angle sensor. The ECU 60 further obtains various types of information from detection signals input from the various aforementioned sensors, such as air intake amount, accelerator pedal position, air-fuel ratio of the air-fuel mixture, and engine coolant temperature. On the basis of the various types of information obtained, the ECU 60 centrally controls the engine 10, by controlling the amount of fuel injection and spark timing, and controlling various devices.

The ECU 60 switches the engine output characteristic (output mode) in three stages (power mode, normal mode, and save mode), by switching a fuel injection amount map, an ignition timing map, and so forth, for example, in accordance with the position of the operation mode selecting switch 61. The ECU 60 transmits information such as engine speed, position of the operation mode selecting switch 61 (or output mode (normal mode/save mode/power mode)), acceleration pedal position, and so forth, to the TCU 40 via the CAN 100.

Further, when the drive assist device 70 is activated, and, for example, constant speed control or preceding vehicle following control is being executed, the ECU 60 controls the output torque of the engine 10 based on a required engine torque instruction (described later in detail) input from the drive assist device 70. The ECU 60 corrects the position of the throttle valve 13, for example, to adjust the output torque of the engine 10, in accordance with the required engine torque.

The drive assist device 70 recognizes external environment (for example, driving environment in front of the vehicle) and emits a warning regarding an obstacle ahead, detects a preceding vehicle in the recognized driving environment, and performs following control and/or warning control regarding the preceding vehicle, thereby assisting driving operations of the driver. More specifically, the drive assist device 70 processes images captured by a stereo camera assembly 71 including a pair of cameras, so as to recognize the external driving environment (a preceding vehicle, for example). The drive assist device 70 then causes the vehicle equipped the drive assist device 70 (hereinafter referred to as "subject vehicle") to travel at a speed set by the driver (constant speed driving control) if no preceding vehicle is detected based on the recognition results (information such as a preceding vehicle). When a preceding vehicle is detected, control is performed so that the subject vehicle follows the preceding vehicle (preceding vehicle following control).

When constant speed control is performed, the drive assist device 70 obtains required driving force necessary for the subject vehicle to drive at the constant speed, and calculates the required engine torque and the required turbine speed based on the required driving force obtained. On the other hand, when preceding vehicle following control is performed, the drive assist device 70 obtains required driving force necessary for the vehicle to follow the preceding vehicle, based on a distance to the preceding vehicle from the subject vehicle, and calculates the required engine torque and the required turbine speed based on the required driving force obtained. The drive assist device 70 then transmits the required engine torque which has been calculated to the ECU 60 via the CAN 100, and also transmits the required turbine speed to the TCU 40. Note that instead of the required turbine speed, the drive assist device 70 may calculate and transmit required engine speed, required primary pulley speed, or required gear ratio.

When the save mode or the normal mode is selected, and the automatic shift mode is simultaneously selected, the TCU 40 execute the stepless shift control mode in accordance with a stepless gearshift map, whereby the gear ratio is automatically and steplessly shifted on the basis of the running state of the subject vehicle (e.g., accelerator pedal position, vehicle speed, etc.). When the power mode is selected, and the automatic shift mode is simultaneously selected, the TCU 40 executes the stepped shift control mode in accordance with a stepped gearshift map, whereby the gear ratio is automatically step-shifted on the basis of the running state of the subject vehicle. The gearshift maps corresponding to the stepless shift control mode and the stepped shift control mode are each stored in the ROM within the TCU 40.

Figure 2:
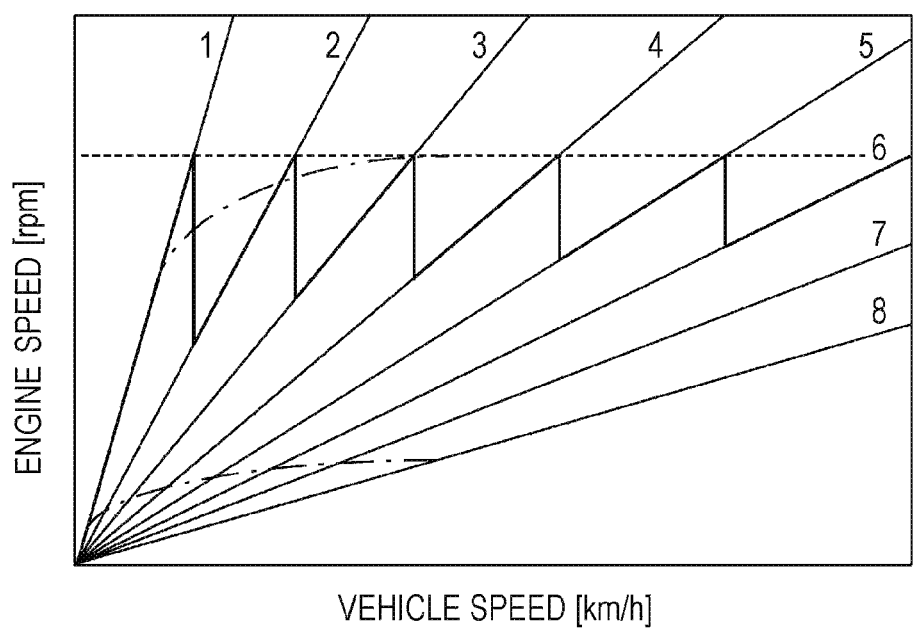
FIG. 2 is a diagram illustrating gear ratio settings of the continuously variable transmission according to the implementation.

FIG. 2 is a gear shift characteristic line diagram, illustrating the relation between engine speed and vehicle speed. The horizontal axis in FIG. 2 represents the vehicle speed (km/h), and the vertical axis represents the engine speed (rpm). The eight solid lines each illustrate the relation between the engine speed and the vehicle speed when the gear ratio is kept constant (at each step) (i.e., gear ratio characteristic when in the stepped shift control mode and the manual shift mode). In the stepless shift mode, any gear ratio from first speed (low) to eighth speed (overdrive) illustrated in FIG. 2 (the region indicated by the single-dot dashed line in FIG. 2) is automatically set in accordance with the vehicle running state. On the other hand, when the manual shift mode has been selected, the TCU 40 controls the gear ratio based on the shift operations accepted by the paddle switches 54 and 55.

Furthermore, when the power mode has been selected and the automatic transmission mode has simultaneously been selected, i.e., the stepped shift control mode has been selected, the TUC performs consistent shift control which does not contradict the intention of the driver, even if the target turbine speed calculated by the continuously variable transmission 30 is not the same as the required turbine speed calculated by the drive assist device 70. Thus, the TCU 40 functionally includes an indicator value acquisition module 41 and a shift control module 42. In the TCU 40, the microprocessor executes a program stored in the ROM, thereby realizing the functions of the indicator value acquisition module 41 and shift control module 42.

The indicator value acquisition module 41 acquires a acquired value of an indicator having correlation with the acceleration request of the driver. More specifically, the indicator value acquisition module 41 acquires, as the acquired values of indicators, the amount of depressing of the accelerator pedal by the driver (how much the driver has operated the accelerator pedal in the direction of acceleration), estimated driving force determined in accordance with the amount of depressing of the accelerator pedal, and the target turbine speed determined in accordance with the running state of the subject vehicle that has been calculated by the TCU 40, received from the ECU 60 via the CAN 100. The amounts of depressing of the accelerator pedal, estimated driving force, and target turbine speed, acquired by the indicator value acquisition module 41, are output to the shift control module 42.

When the power mode has been selected by the operating mode selecting switch 61, i.e., the stepped shift control mode has been selected, and the acquired value of the indicator obtained by the indicator value acquisition module 41 is larger than the required value for the same indicator calculated from the required driving force obtained by the drive assist device 70, the shift control module 42 executes shift control by the stepped shift control mode. If the acquired value of the indicator is smaller than the required value for the same indicator calculated from the required driving force, the shift control module 42 executes shift control by the stepless shift control mode.

More specifically, when the amount of depressing of the accelerator pedal (or the actual position of the throttle valve 13) acquired by the indicator value acquisition module 41 is larger than the required amount of depressing of the accelerator pedal (or the required position of the throttle valve 13) calculated from the required driving force obtained by the drive assist device 70, the shift control module 42 executes shift control by the stepped shift control mode. In the same way, if the target turbine speed is higher than the required turbine speed, the shift control module 42 executes shift control by the stepped shift control mode. Further, when the estimated driving force is larger than the required driving force, the shift control module 42 executes shift control by the stepped shift control mode.

On the other hand, when the power mode has been selected by the operating mode selecting switch 61, i.e., the stepped shift control mode has been selected, and the amount of depressing of the accelerator pedal (how much the driver has operated the accelerator pedal in the direction of acceleration) is smaller than the required amount of depressing of the accelerator pedal calculated from the required driving force, the target turbine speed is lower than the required turbine speed, and the estimated driving force is smaller than the required driving force, the shift control module 42 executes shift control by the stepless shift control mode.

Note that when shift control by stepless shift control mode is performed (that is to say, when the normal mode or save mode has been selected by the operating mode selecting switch 61, and when the power mode has been selected by the operating mode selecting switch 61 and also the required driving force by the driver is smaller than the required driving force obtained by the drive assist device 70), the shift control module 42 compares the required turbine speed with the target turbine speed, and employs the larger value of the two. Alternatively, any one of required engine speed, required primarily pulley speed, and required gear ratio may be used instead of the required turbine speed, and correspondingly any one of target engine speed, target primarily pulley speed, and target gear ratio may be used instead of the target turbine speed.

Figure 3:
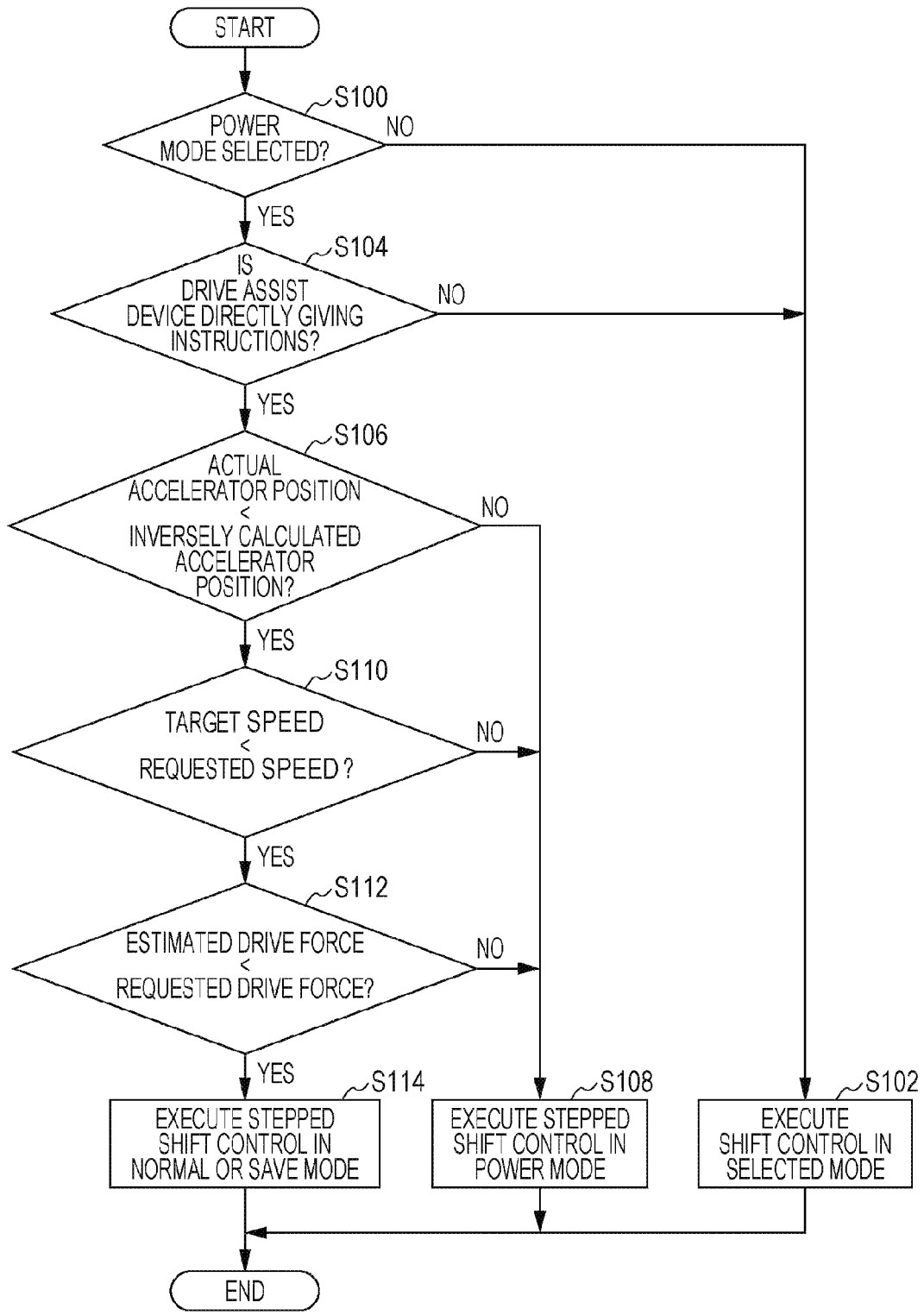
FIG. 3 is a flowchart illustrating a flowchart of processing procedures for shift control (shift control mode switching processing) by a shift control device for a continuously variable transmission according to the implementation.

Next, the operations of the shift control device 1 of the continuously variable transmission will be described with reference to FIG. 3. FIG. 3 is a flowchart illustrating a flowchart of processing procedures for shift control (shift control mode switching processing) by the shift control device 1 for the continuously variable transmission. This processing is repeated by the TCU 40 every certain time interval (e.g., every 10 ms).

First, in step S100, determination is made regarding whether or not the D range (automatic shift mode) has been selected and also the power mode has been selected, i.e., whether or not the stepped shift control mode has been selected. When the power mode (stepped shift control mode) has not been selected, the flow advances to step S102. On the other hand, when the power mode (stepped shift control mode) has been selected, the flow advances to step S104.

In step S102, the shift control mode of the continuously variable transmission 30 (TCU 40) is set to the shift control mode selected based on the operation position of the operating mode selecting switch 61, which is the normal mode or save mode (stepped shift control mode) in the present implementation, and shift control is executed. Note that the larger value of the required turbine speed set by the drive assist device 70, and the target turbine speed set according to the running state of the vehicle, is employed to execute the shift control. Thereafter, the flow ends.

In step S104, determination is made regarding whether or not the drive assist device 70 has been activated and required turbine speed (alternatively, required engine speed, required primary pulley speed, required gear ratio) set according to required driving force by the drive assist device 70 is input. When the drive assist device 70 has not been activated, the flow advances to step S102. On the other hand, when the drive assist device 70 has been activated and required turbine speed is input, the flow advances to step S106.

In step S102, as described above, the shift control mode of the continuously variable transmission 30 (TCU 40) is set to the shift control mode selected based on the operation position of the operating mode selecting switch 61 which is the power mode (stepless shift control mode) in the present implementation, and shift control is executed. Thereafter, the flow ends.

In step S106, determination is made regarding whether or not the amount of depressing of the accelerator pedal (how much the driver has operated the accelerator pedal in the direction of acceleration) is smaller than the required depressing amount of the accelerator pedal, which is inversely calculated from the required driving force calculated by the drive assist device 70. When the depressing amount of the accelerator pedal is equal to or greater than the required amount, the flow advances to step S108. On the other hand, when the depressing amount of the accelerator pedal is smaller than the required amount, the flow advances to step S110.

In step S108, the shift control mode of the continuously variable transmission 30 is set to the power mode (stepped shift control mode), and stepped shift control is executed based on the target gear ratio or the target speed set in accordance with the running state of the vehicle. Thereafter, the flow ends.

In step S110, determination is made regarding whether or not the target turbine speed (alternatively, target engine speed, target primary pulley speed, target gear ratio) calculated by the continuously variable transmission 30 is smaller than the required turbine speed (alternatively, required engine speed, required primary pulley speed, required gear ratio) required by the drive assist device 70. When the target turbine speed is equal to or above the required turbine speed, the shift control mode of the continuously variable transmission 30 is set to the power mode (stepped shift control mode), and stepped shift control is executed. Thereafter, the flow ends. On the other hand, when the target turbine speed is lower than the required turbine speed, the flow advances to step S112.

In step S112, determination is made regarding whether or not the estimated driving force set in accordance with the amount of depressing of the accelerator pedal is smaller than the required driving force calculated by the drive assist device 70. When the estimated driving force is equal to or larger than the required driving force, in step S108, the shift control mode of the continuously variable transmission 30 is set to the power mode (stepped shift control mode), and stepped shift control is executed. Thereafter, the flow ends. On the other hand, when the estimated driving force is smaller than the required driving force, the flow advances to step S114.

In step S114, the shift control mode of the continuously variable transmission 30 is set to the normal mode or the save mode (stepless shift control mode), and shift control is executed based on the greater value of the required turbine speed set by the drive assist device 70 and the target turbine speed determined by the continuously variable transmission 30. Thereafter, the flow ends.

As described in detail above, according to the implementation, when the operating mode selecting switch 61 has been operated by the driver so as to select the stepped shift control mode) and the stepped shift control mode has been selected by the operating mode selecting switch 61 (i.e., shift control is executed by the stepped shift control mode if an acquired value of an indicator having correlation with the acceleration request of the driver (acceleration intention) is greater than a required value of the same indicator calculated from the required driving force calculated by the drive assist device 70. On the other hand, shift control is executed by the stepless shift control mode if an acquired value of an indicator having correlation with the acceleration request of the driver is smaller than the required value of the same indicator calculated from the required driving force. That is to say, when the driving force request of the driver is determined to be greater than the required driving force of the drive assist device 70, shift control is executed by the stepped shift control mode. On the other hand, when the driving force request of the driver is determined to be smaller than the required driving force of the drive assist device 70, shift control is executed by the stepless shift control mode. As a result, even when the target turbine speed or target gear ratio calculated by the continuously variable transmission 30 is not the same as the required turbine speed or required gear ratio calculated by the drive assist device 70, consistent shift control can be performed which does not contradict the intention of the driver.

According to the implementation, when the stepless shift control mode has been selected, the greater of the required gear ratio based on the required driving force set by the drive assist device 70 and the target gear ratio set by running conditions of the subject vehicle. Accordingly, the target gear ratio or target speed calculated by the continuously variable transmission 30, and the required gear ratio or target speed set by the drive assist device 70, can be employed in an appropriate and consistent manner.

In particular, when the amount of depressing the accelerator by the driver is greater than the required accelerator depressing amount inversely calculated from the required driving force calculated by the drive assist device 70, when the target turbine speed set according to the running state of the subject vehicle is larger than the required turbine speed calculated by the drive assist device 70, and when the estimated driving amount set according to the amount of depressing the accelerator pedal by the driver is greater than the required driving force from the drive assist device 70, i.e., the driving force request by the user is determined to be greater than the required driving force of the drive assist device 70, shift control is executed by the stepped shift control mode. Thus, shifting can be performed which meets the acceleration intention of the driver.

Now, when the accelerator pedal is depressed to accelerate, stepped acceleration is performed in the stepped shift control mode. In doing so, when shifting up from, for example, the third gear to the fourth gear, engine torque is reduced to raise shift speed. According to the implementation, even if the drive assist device 70 sends, as the required gear ratio, a gear ratio (or equivalent required turbine speed) of around 3.5 at the time of shifting up, the continuously variable transmission 30 executes the stepped shift control mode (i.e., the target turbine speed of the continuously variable transmission 30 is employed) because the accelerator pedal is depressed, so whereby the gear ratio does not stop at 3.5 and is shifted up to fourth. Accordingly, the driver is not subjected to a feeling of wrongness.

In the implementation, on the other hand, when determination is made that the amount of depressing the acceleration pedal is smaller than the required acceleration pedal depressing amount calculated from the required driving force, that the target turbine speed is lower than the required turbine speed, and that the estimated driving amount is smaller than the required driving force, shift control by the stepless shift control mode is performed. Accordingly, performing gear ratio control according to the required driving force of the drive assist device 70 does not give the driver a feeling of wrongness.

The present invention is not restricted to the above implementation, and various modifications may be made. For example, while the present invention has been applied to a chain type continuously variable transmission (CVT) in the above implementation, the present invention may be applied to a belt type continuously variable transmission or a toroidal continuously variable transmission as well, for example, instead of a chain type continuously variable transmission.

While the configuration of the implementation has been described as output characteristic of the engine 10 being switchable in three stages, a configuration may be made where the output characteristic is switchable in two stages, or four of more stages.

While the ECU 60 that controls the engine 10 has been described in the above implementation as being separate hardware from the TCU 40 that controls the continuously variable transmission 30, an integrated hardware configuration may be used.

The invention claimed is:

1. A shift control device for a continuously variable transmission that has a stepless shift control mode where a gear ratio is automatically steplessly shifted, and a stepped shift control mode where a gear ratio is automatically shifted in a stepped manner, in the same way as with a stepped automatic transmission, the shift control device comprising:
    a selection operation accepting unit that accepts a driver's selecting operation between the stepless shift control mode and the stepped shift control mode;
    a drive assist device that recognizes an environment outside of a vehicle, and calculates required driving force for the vehicle;
    an indicator value acquisition module that acquires an acquired value of an indicator having correlation with an acceleration request by the driver; and
    a shift control module that, when the stepped shift control mode has been selected by the selection operation accepting unit and the acquired value is greater than a required value of the indicator calculated from a required driving force calculated by the drive assist device, executes shift control in the stepped shift control mode, and if the acquired value is smaller than the required value, executes shift control in the stepless shift control mode.

2. The shift control device for a continuously variable transmission according to claim 1,
    wherein the drive assist device sets a required gear ratio or a required speed based on the required driving force,
    and wherein,
        when performing shift control by the stepped shift control mode, the shift control module performs shift control based on a target gear ratio or a target speed that is set according to a running state of the vehicle, and
        when performing shift control by the stepless shift control mode, the shift control module compares the required gear ratio with the target gear ratio or the required speed with the target speed, and performs shift control based on the greater value.

3. The shift control device for a continuously variable transmission according to claim 1,
wherein the indicator value acquisition module acquires an accelerator depressing amount by the driver as the acquired value,
and wherein,
when an acquired accelerator depressing amount acquired by the indicator value acquisition module is greater than a required accelerator depressing amount calculated from the required driving force obtained by the drive assist device, the shift control module executes shift control by the stepped shift control mode, and
when the acquired accelerator depressing amount is smaller than the required accelerator depressing amount, the shift control module executes shift control by the stepless shift control mode.

4. The shift control device for a continuously variable transmission according to claim 2,
wherein the indicator value acquisition module acquires an accelerator depressing amount by the driver as the acquired value,
and wherein,
when an acquired accelerator depressing amount acquired by the indicator value acquisition module is greater than a required accelerator depressing amount calculated from the required driving force obtained by the drive assist device, the shift control module executes shift control by the stepped shift control mode, and
when the acquired accelerator depressing amount is smaller than the required accelerator depressing amount, the shift control module executes shift control by the stepless shift control mode.

5. The shift control device for a continuously variable transmission according to claim 1,
wherein the indicator value acquisition module acquires either one of the target gear ratio and the target speed, set according to the running state of the vehicle, as the acquired value,
and wherein,
when an acquired target gear ratio acquired by the indicator value acquisition module is greater than the required gear ratio or an acquired target speed acquired by the indicator value acquisition module is higher than the required speed, the shift control module executes shift control by the stepped shift control mode, and
when the acquired target gear ratio is smaller than the required gear ratio or the acquired target speed is lower than the required speed, the shift control module executes shift control by the stepless shift control mode.

6. The shift control device for a continuously variable transmission according to claim 2,
wherein the indicator value acquisition module acquires either one of the target gear ratio and the target speed, set according to the running state of the vehicle, as the acquired value,
and wherein,
when an acquired target gear ratio acquired by the indicator value acquisition module is greater than the required gear ratio or an acquired target speed acquired by the indicator value acquisition module is higher than the required speed, the shift control module executes shift control by the stepped shift control mode, and
when the acquired target gear ratio is smaller than the required gear ratio or the acquired target speed is lower than the required speed, the shift control module executes shift control by the stepless shift control mode.

7. The shift control device for a continuously variable transmission according to claim 3,
wherein the indicator value acquisition module acquires either one of the target gear ratio and the target speed, set according to the running state of the vehicle, as the acquired value,
and wherein,
when an acquired target gear ratio acquired by the indicator value acquisition module is greater than the required gear ratio or an acquired target speed acquired by the indicator value acquisition module is higher than the required speed, the shift control module executes shift control by the stepped shift control mode, and
when the acquired target gear ratio is smaller than the required gear ratio or the acquired target speed is lower than the required speed, the shift control module executes shift control by the stepless shift control mode.

8. The shift control device for a continuously variable transmission according to claim 4,
wherein the indicator value acquisition module acquires either one of the target gear ratio and the target speed, set according to the running state of the vehicle, as the acquired value,
and wherein,
when an acquired target gear ratio acquired by the indicator value acquisition module is greater than the required gear ratio or an acquired target speed acquired by the indicator value acquisition module is higher than the required speed, the shift control module executes shift control by the stepped shift control mode, and
when the acquired target gear ratio is smaller than the required gear ratio or the acquired target speed is lower than the required speed, the shift control module executes shift control by the stepless shift control mode.

9. The shift control device for a continuously variable transmission according to claim 1,
wherein the indicator value acquisition module acquires an estimated driving force set according to an accelerator depressing amount as the acquired value,
and wherein,
when an acquired estimated driving force acquired by the indicator value acquisition module is greater than the required driving force, the shift control module executes shift control by the stepped shift control mode, and
when the acquired estimated driving force is smaller than the required driving force, the shift control module executes shift control by the stepless shift control mode.

10. The shift control device for a continuously variable transmission according to claim 2,
wherein the indicator value acquisition module acquires an estimated driving force set according to an accelerator depressing amount as the acquired value,
and wherein,
when an acquired estimated driving force acquired by the indicator value acquisition module is greater than the required driving force, the shift control module executes shift control by the stepped shift control mode, and when the acquired estimated driving force is smaller than the required driving force, the shift control module executes shift control by the stepless shift control mode.

11. The shift control device for a continuously variable transmission according to claim 3,
wherein the indicator value acquisition module acquires an estimated driving force set according to an accelerator depressing amount as the acquired value,
and wherein,
when an acquired estimated driving force acquired by the indicator value acquisition module is greater than the required driving force, the shift control module executes shift control by the stepped shift control mode, and
when the acquired estimated driving force is smaller than the required driving force, the shift control module executes shift control by the stepless shift control mode.

12. The shift control device for a continuously variable transmission according to claim 4,
wherein the indicator value acquisition module acquires an estimated driving force set according to an accelerator depressing amount as the acquired value,
and wherein,
when an acquired estimated driving force acquired by the indicator value acquisition module is greater than the required driving force, the shift control module executes shift control by the stepped shift control mode, and
when the acquired estimated driving force is smaller than the required driving force, the shift control module executes shift control by the stepless shift control mode.

13. The shift control device for a continuously variable transmission according to claim 5,
wherein the indicator value acquisition module acquires an estimated driving force set according to an accelerator depressing amount as the acquired value,
and wherein,
when an acquired estimated driving force acquired by the indicator value acquisition module is greater than the required driving force, the shift control module executes shift control by the stepped shift control mode, and
when the acquired estimated driving force is smaller than the required driving force, the shift control module executes shift control by the stepless shift control mode.

14. The shift control device for a continuously variable transmission according to claim 6,
wherein the indicator value acquisition module acquires an estimated driving force set according to an accelerator depressing amount as the acquired value,
and wherein,
when an acquired estimated driving force acquired by the indicator value acquisition module is greater than the required driving force, the shift control module executes shift control by the stepped shift control mode, and
when the acquired estimated driving force is smaller than the required driving force, the shift control module executes shift control by the stepless shift control mode.

15. The shift control device for a continuously variable transmission according to claim 7,
wherein the indicator value acquisition module acquires an estimated driving force set according to an accelerator depressing amount as the acquired value,
and wherein,
when an acquired estimated driving force acquired by the indicator value acquisition module is greater than the required driving force, the shift control module executes shift control by the stepped shift control mode, and
when the acquired estimated driving force is smaller than the required driving force, the shift control module executes shift control by the stepless shift control mode.

16. The shift control device for a continuously variable transmission according to claim 8,
wherein the indicator value acquisition module acquires an estimated driving force set according to an accelerator depressing amount as the acquired value,
and wherein,
when an acquired estimated driving force acquired by the indicator value acquisition module is greater than the required driving force, the shift control module executes shift control by the stepped shift control mode, and
when the acquired estimated driving force is smaller than the required driving force, the shift control module executes shift control by the stepless shift control mode.

* * * * *